United States Patent Office 3,476,750
Patented Nov. 4, 1969

3,476,750
THIAZOLO AND THIAZINO POLYCYCLIC ISOQUINOLINES
Leslie G. Humber, Dollard des Ormeaux, Quebec, Canada, assignor to American Home Products Corporation, New York, N.Y., a corporation of Delaware
No Drawing. Filed July 18, 1967, Ser. No. 654,061
Int. Cl. C07d 93/08, 91/42; A61k 27/00
U.S. Cl. 260—243
6 Claims

ABSTRACT OF THE DISCLOSURE

There are disclosed herein 1-oxo-1,2,7,8,12b,13-hexahydro - 3aH - benzo[1,2]cyclohepta[3,4,5-d,c]thiazolo-[2,3-a]isoquinoline and 1-oxo-2,3,8,9,13b,14 - hexahydro-1H,4aH-benzo[1,2]cyclohepta[3,4,5-d,e] - 1,3 - thiazino-[2,3-a]isoquinoline, and their corresponding S-oxides and S,S-dioxides. The compounds are useful as antibacterial and trichomonacidal agents and methods for their preparation and use are also given.

---

This invention relates to certain novel polycyclic thiazino and thiazolo[2,3-a]isoquinoline derivatives. More particularly, it relates to compounds possessing a heterocyclic, sulfur containing ring, fused onto a 1,2,3,7,8,12b-hexahydrobenzo[1,2]cyclohepta[3,4,5 - d,e]isoquinoline nucleus. The novel compounds of this invention are characterized by the generic structural Formula I:

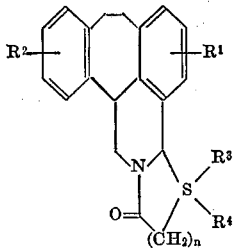

wherein $R^1$ and $R^2$ may represent one or more substituents on an aromatic ring, such substituents including lower alkyl, halogen, hydroxyl, alkylthio, and trihalomethyl groups, $R^3$ or $R^4$ may each represent a pair of electrons on the sulfur atom, or an oxygen atom, and $n$ is an integer of from 1–2. Thus, when $R^3$ and $R^4$ each represent a pair of electrons, the compounds are thiazino or thiazolo derivatives; when $R^3$ represents an oxygen atom and $R^4$ represents a pair of electrons the compounds are derivatives of thiazino- or thiazolo-S-oxides; and when $R^3$ and $R^4$ each represent an oxygen atom the compounds are derivatives of thiazino- or thiazolo-S,S-dioxides.

This invention also relates to processes for the preparation of the pharmacologically active compounds described herein, and to intermediates used in their preparation. These processes are illustrated schematically below and are described further in the examples.

The compounds of this invention possess antibacterial and trichomonacidal activities and are useful as antibacterial and trichomonacidal agents for topical application. As antibacterial agents they are effective against certain gram-positive and gram-negative organisms such as, for example, *Staphylococcus pyogenes* (both penicillin-sensitive and penicillin-resistant strains), *Sarcina lutea*, *Streptococcus faecalis*, *Escherichia coli*, *Salmonella pullorum*, *Proteus mirabilis*, and *Proteus vulgaris*. They may be used in ointments, creams, or lotions containing from 0.1 to 1 percent of the active ingredient, for topical application.

As trichomonacidal agent, the compounds of this invention are active against *Trichomonas vaginalis* and *Trichomonas foetus*, and may be formulated in the form of vaginal inserts or creams containing from 0.05 to 1 percent of the active ingredient, for topical application.

More specifically, I prefer to use as the starting materials required for the synthesis of the novel compounds of this invention, the compounds of Formula II which are prepared by a three-step process starting with the appropriately substituted 10,11-dihydro-5H-dibenzo[a,d]-cyclohepten-5-ylnitrile. For example, the compound II wherein $R^1$ and $R^2$ represent hydrogen, is prepared from 10,11-dihydro - 5H - dibenzo[a,d]cyclohepten-5-ylnitrile itself (M. A. Davis et al., J. Med. Chem., 6, 251 (1963)), by reducing it with a suitable reducing agent to obtain 10,11-dihydro-5H-dibenzo[a,d]cyclohepten - 5 - ylmethylamine, and this latter compound is treated with a formic acid derivative to obtain N-formyl 10,11-dihydro-5H-dibenzo[a,d]-cyclohepten-5-ylmethylamine, which, when treated with polyphosphoric acid under suitable conditions yields 1,7,8,12b-tetrahydrobenzo[1,2]cyclohepta[3,4,5-d,e] - isoquinoline of structural Formula II, wherein $R^1$ and $R^2$ represent hydrogen.

The compounds of Formula II are reacted with a mercaptoalkanoic acid, or a derivative thereof, of the formula HS—$(CH_2)_n$—CO—$R^5$, wherein $n$ has the significance described above, and $R^5$ may represent a hydroxyl, a methoxyl or, an ethoxyl group, to yield the compounds of structural Formula III, wherein $R^1$, $R^2$, and $n$ have the same significance as described above, and $R^3$ and $R^4$ each represent an electron pair situated on a sulfur atom.

The reactions of the compounds of Formula II, with those of formula HS—$(CH_2)_n$—CO—$R^5$ may be carried out at a temperature between 50° C. and 150° C. in the absence of a solvent, or in the presence of a suitably inert solvent, such as, for example, an aromatic or a non-aromatic hydrocarbon, or a lower alkanol, with concomitant elimination of the element of H—$R^5$. The compounds thus obtained may be converted to the corresponding S-oxides and/or S,S-dioxides by treatment with a suitable oxidizing agent, such as, for example, an alkali metal metaperiodate, an alkali metal permanganate, hydrogen peroxide, meta-chloroperbenzoic acid, and perbenzoic acid. The reaction may be conducted within the temperature range of from 0° C. to 100° C., by mixing together the oxidizing agent and the substrate for oxidation, in a suitable solvent in which one or both of the reactants are soluble. Such solvents include lower alkanols, water, acetic acid and chlorinated hydrocarbons.

The following examples and formulae, in which $R^1$, $R^2$, $R^3$, $R^4$ and $n$ have the significance described above, are illustrative of this invention.

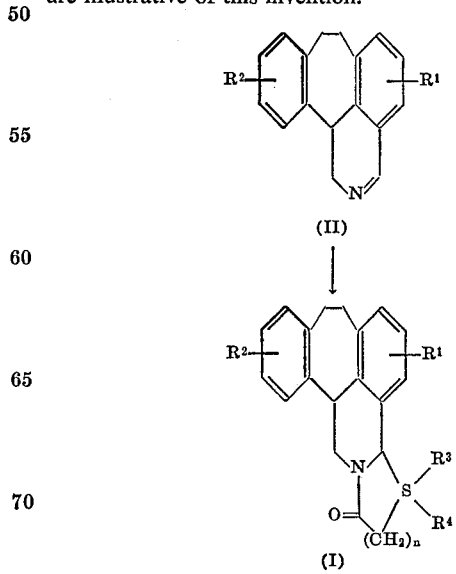

EXAMPLE 1

1-oxo-1,2,7,8,12b,13-hexahydro-3aH-benzo[1,2]cyclohepta[3,4,5-d,e]thiazolo[2,3-a]isoquinoline 1,7,8,12b - tetrahydrobenzo[1,2]cyclohepta[3,4,5-d,e]-isoquinoline (23.25 g., 0.1 mole) and methyl mercaptoacetate (15.9 g., 0.15 mole) are combined in xylene (250 ml.) and the mixture is refluxed for 24 hours. On cooling to 0° C., the title compound is obtained as a crystalline mass, which is recrystallized from acetone to M.P. 205–206° C.

By working in a similar manner to that described above, but using 3-mercaptopropionic acid (15.9 g., 0.15 mole) instead of methyl mercaptoacetate, one obtains 1-oxo-2,3,8,9,13b,14 - hexahydro - 1H,4aH - benzo[1,2]cyclohepta[3,4,5-d,e]-1,3-thiazino - [2,3-a] - isoquinoline, M.P. 235–235.5° C., when crystallized from a chloroform-tetrahydrofuran mixture.

EXAMPLE 2

1 - oxo - 2,3,8,9,13b,14 - hexahydro - 1H,4aH - benzo[1,2]cycloheptal[3,4,5 - d,e]1,3 - thiazino[2,3 - a]isoquinoline-S-oxide 1-oxo - 2,3,8,9,13b,14 - hexahydro - 1H,4aH - benzo[1,2]cyclohepta[3,4,5 - d,e] - 1,3 - thiazino[2,3-a]isoquinoline (1.6 g., 0.005 mole) dissolved in methylene dichloride (40 ml.) is treated at room temperature with a solution of 85 percent m-chloroperbenzoic acid (1.07 g., 0.0053 mole) in methylene dichloride. The mixture is stirred for two hours then washed with a dilute aqueous sodium bicarbonate solution. The organic phase is dried with sodium sulfate and evaporated in vacuo to yield a solid residue which is chromatographed on alumina. Elution with benzene containing 10 to 25 percent of chloroform yields the title compound with M.P. 155° C. when crystallized from a benzene-hexane mixture. The empirical formula $C_{20}H_{19}NSO_2$ is confirmed by elemental analysis.

By working in a similar manner to that described above, but by using an excess of m-chloroperbenzoic acid there is obtained 1 - oxo - 2,3,8,9,13b,14 - hexahydro-1H,4aH - benzo[1,2]cyclohepta[3,4,5 - d,e] - 1,3 - thiazino[2,3-a]isoquinoline-S,S-dioxide, $\nu_{max.}^{CHCl_3}$ 1127 and 1335 cm.$^{-1}$ In the same manner as described above, but using as starting material 1 - oxo - 1,2,7,8,12b,13 - hexahydro-3aH - benzo[1,2]cyclohepta[3,4,5 - d,e]thiazolo[2,3 - a]isoquinoline there are obtained 1 - oxo - 1,2,7,8,12b,13-hexahydro - 3aH - benzo[1,2]cyclohepta[3,4,5 - d,e]thiazolo[2,3 - a]isoquinoline - S - oxide and 1 - oxo - 1,2,7,8,12b,13 - hexahydro - 3aH - benzo[1,2]cyclohepta[3,4,5-d,e]thiazolo[2,3-a]isoquinoline-S,S-dioxide.

I claim:

1. 1 - oxo - 1,2,7,8,12b,13 - hexahydro - 3aH - benzo[1,2]cyclohepta[3,4,5-d,e]thiazolo[2,3-a]isoquinoline.

2. 1 - oxo - 2,3,8,9,13b,14 - hexahydro - 1H,4aH-benzo[1,2]cyclohepta[3,4,5-d,e] - 1,3 - thiazino - [2,3-a]-isoquinoline.

3. 1 - oxo - 2,3,8,9,13b,14 - hexahydro - 1H,4aH-benzo[1,2]cyclohepta[3,4,5 - d,e]1,3 - thiazino[2,3 - a]isoquinoline-S-oxide.

4. 1 - oxo - 2,3,8,9,13b,14 - hexahydro - 1H,4aH-benzo[1,2]cyclohepta[3,4,5 - d,e] - 1,3 - thiazino[2,3-a]isoquinoline-S,S-dioxide.

5. 1 - oxo - 1,2,7,8,12b,13 - hexahydro - 3aH - benzo[1,2]cyclohepta[3,4,5 - d,e]thiazolo[2,3 - a]isoquinoline-S-oxide.

6. 1 - oxo - 1,2,7,8,12b,13 - hexahydro - 3aH - benzo[1,2]cyclohepta[3,4,5 - d,e] - thiazolo[2,3 - a]isoquinoline-S,S-dioxide.

References Cited

UNITED STATES PATENTS

| | | |
|---|---|---|
| 3,354,162 | 11/1967 | Humber et al. ___ 260—283 XR |
| 3,361,751 | 1/1968 | Humber et al. _____ 260—289 |
| 3,403,155 | 9/1968 | Humber et al. _____ 260—283 |

HENRY R. JILES, Primary Examiner

JOHN M. FORD, Assistant Examiner

U.S. Cl. X.R.

260—283, 289, 999